L. D. BLISS.
TEMPERATURE MEASURING DEVICE FOR SURGICAL INSTRUMENTS.
APPLICATION FILED MAY 27, 1916.
1,190,978.
Patented July 11, 1916.
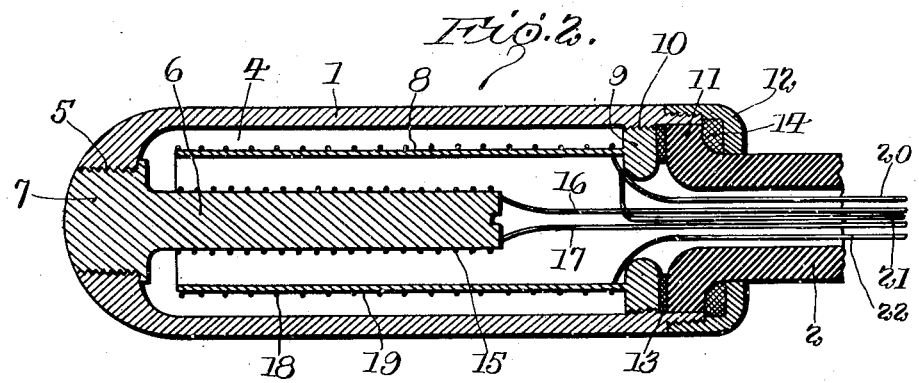
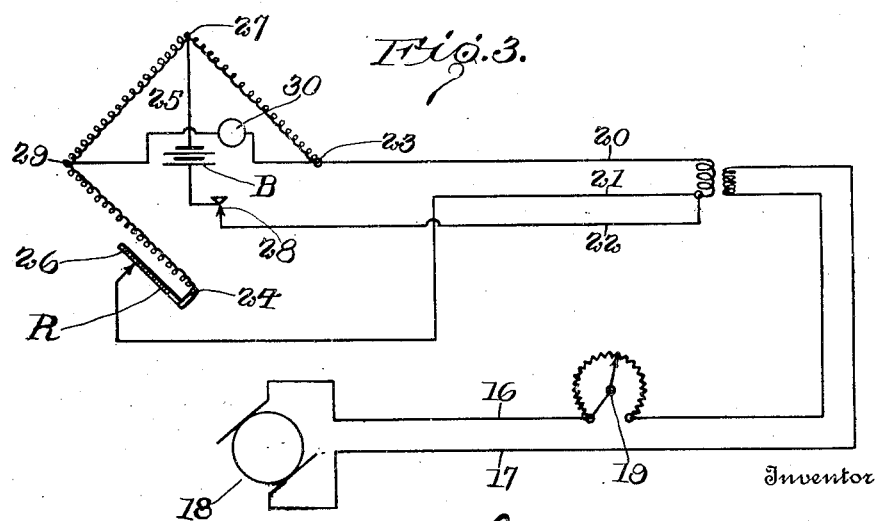
Witnesses
Albert Popkins
Grace P. Brereton
Inventor
Louis D. Bliss
By
Sturtevant & Mason
Attorneys

UNITED STATES PATENT OFFICE.

LOUIS D. BLISS, OF NORTH TAKOMA, MARYLAND, ASSIGNOR OF ONE-HALF TO HOWARD R. BLISS, OF NEW YORK, N. Y.

TEMPERATURE-MEASURING DEVICE FOR SURGICAL INSTRUMENTS.

1,190,978.   Specification of Letters Patent.   Patented July 11, 1916.

Application filed May 27, 1916. Serial No. 100,424.

*To all whom it may concern:*

Be it known that I, LOUIS D. BLISS, a citizen of the United States, residing at North Takoma, in the county of Montgomery, State of Maryland, have invented certain new and useful Improvements in Temperature-Measuring Devices for Surgical Instruments, of which the following is a description, reference being had to the accompanying drawing and to the figures of reference marked thereon.

The invention relates to new and useful improvements in temperature measuring devices for surgical instruments, and more particularly to a device for indicating at a point distant therefrom the temperature of the operating head of the surgical instrument.

An object of the invention is to provide devices whereby the surface temperature of the head of the surgical instrument may be correctly and quickly measured.

A further object of the invention is to provide a temperature measuring device of the above character, together with means for regulating the temperature of the head of the surgical instrument.

These and other objects will in part be obvious and will in part be hereinafter more fully disclosed.

In the drawings, which show by way of illustration one embodiment of the invention:—Figure 1 is a side view of an instrument embodying my improvements; Fig. 2 is a longitudinal sectional view through the head of the instrument; Fig. 3 is a diagrammatic view, showing the circuits, the heating coil, means for energizing the same, also the thermometer coil, and the temperature measuring devices associated therewith.

The invention consists generally in a surgical instrument having an operating head which may be of any desired shape and which is rigidly supported by a handle. This supporting head consists preferably of a hollow copper shell having a copper stud rigidly connected thereto and projecting longitudinally of the head and around which is a heating coil so that the copper head may be heated electrically through this heating coil. The heating coil is connected to a suitable source of current supply, and in this circuit with the heating coil is a rheostat and such other devices as may be desirable for controlling and protecting the supply of heat to the heating coil. Also located within the hollow head is a copper sleeve which is connected to the head so that the sleeve is heated mainly through conductivity and, therefore, said sleeve will be practically the same temperature as the outer surface of the copper head. On the outer face of this copper sleeve and insulated therefrom by mica or other suitable insulation is a thermometer coil which is connected to a Wheatstone bridge. Suitable devices are associated with the Wheatstone bridge so that the same may be calibrated for indicating the surface temperature of the copper head at a point distant from the head.

Referring more in detail to the drawings:—My improved surgical instrument consists of an operating head 1 which is rigidly attached to a hollow, hard rubber, handle 2 having a hand-grip 3. This head 1 is preferably formed of copper and is hollow, forming a central cylindrical chamber 4. The extreme outer end of the head 1 is formed with an opening which is threaded at 5, and a projecting copper stud 6 has a threaded shank 7 which engages this threaded opening, and this rigidly supports the stud 6 so that it projects into the chamber 4 and extends longitudinally of the supporting head 1.

Extending longitudinally of the chamber 4 is a copper sleeve 8 which is formed integral with a supporting collar 9 threaded at 10 to engage a thread formed internally of the supporting head and back a short distance from the extreme open end thereof. The handle 2 which, as above noted, is preferably made of hard rubber, is adapted to extend into the head 1 and is formed with an outwardly turned flange 11. Said handle is secured to the head by a cap 12, and rubber gaskets 13 and 14 may be applied so as to form a rigid and tight water-proof connection between the handle and the head of the instrument. The gasket 13 is forced against the collar 9, and the gasket 14 is forced against the flange 11 when the cap 12 is screwed onto the head of the instrument.

The head of the instrument, according to the present disclosure, is heated electrically. This is accomplished by a heating coil 15 which surrounds and extends substantially the entire length of the copper stud 6. The wires 16 and 17 lead from the heating coil and are carried out through the handle 2 and to a suitable source of current supply which may consist of a generator 18ᵃ. In one of the lines leading from the heating coil is a rheostat 19ᵃ. Suitable fuses, switches, and lamps, if desired, may also be used in this heating coil circuit. By adjusting the rheostat, the temperature to which the head of the surgical instrument is heated may be varied, as desired.

The instrument referred to above is particularly adapted for the local treatment by heat applications of internal surfaces of the human body. It is essential that the temperature of this head shall be regulated with very great certainty in order to avoid injury to the very delicate membrane covering the surface of the parts thus treated. With the above described heating arrangement, I am able to uniformly heat the entire operating head and to graduate the temperature to which the instrument is heated so that any desired temperature may be obtained within certain limits. Owing to the air space between the heating coil and the inner surface of the shell forming the operating head, and also owing to the interposed sleeve 8 above described, the shell or outer surface of the operating head will be heated largely through the conduction of the heat through the metal, rather than by radiation.

In order that the surface temperature of the operating head may be accurately measured, I have provided a temperature measuring device which constitutes the main and important feature of my invention. This temperature measuring device includes a thermometer coil 18 which is coiled about the outer surface of the sleeve 8 and is insulated therefrom by mica or other suitable insulation, indicated at 19. There are three lines leading from this thermometer coil which are indicated at 20, 21 and 22. The lines 20 and 21 are connected to the terminals 23 and 24, respectively, of a Wheatstone bridge, indicated as a whole at 25 in Fig. 3 of the drawings. Between the terminals 23 and 24 is a resistance, indicated at R, and the line 21 is shiftable along this resistance, and the point of connection between the line 21 and the resistance R is indicated by a graduated scale 26. The line 22 is connected to one terminal of a battery B, the other terminal of the battery being connected to the terminal 27 of the Wheatstone bridge. In this line 22 is a switch, indicated at 28, which is normally open. Connected across the terminals 23 and 29 of the Wheatstone bridge is a line including a galvanometer 30. This measuring means broadly is a well-known construction in electrical thermometers, and further description thereof is not thought necessary. The connection to the resistance R is shifted until a point is reached where the closing of the switch 28 indicates zero in the galvanometer 30 and then the scale 26, which is calibrated in degrees of temperature, indicates the temperature of the surface of the operating head of the instrument.

The sleeve 8 is made of copper and is integral with the collar 9 which is directly supported by the copper shell 1 forming the body of the head of the instrument. This sleeve 8 is heated through conductivity mainly and, therefore, the surface temperature of the operating head will be substantially the same as the temperature of this sleeve. The thermometer coil is protected from direct radiation from the heating coil by being on the outer face of the sleeve and, therefore, the thermometer coil will indicate substantially the surface temperature of the operating head.

The electrical thermometer above described with its controlling coil constructed and arranged so as to indicate substantially the surface temperature of the operating head affords a means for almost instantly indicating the temperature of the operating head and substantially the exact temperature thereof.

While I have shown and described electrical means for heating the operating head, it will be understood that other ways of heating the head may be used without departing from the spirit of the invention as set forth in the appended claims, as the essential feature of my invention is the temperature measuring device with the controlling coil constructed and arranged for accomplishing the purposes above stated.

It will be obvious that minor changes in the details of construction and the arrangement of parts may be made without departing from the spirit of the invention as set forth in the appended claims.

Having thus described the invention, what I claim as new and desire to secure by Letters Patent is:—

1. A surgical instrument comprising an operating head, means for supporting said head, means for heating said operating head, and an electrical thermometer including a controlling coil constructed and arranged relative to the supporting head so as to be responsive to the surface temperature of said head.

2. A surgical instrument comprising a hollow copper head, a handle for supporting said head, an electrical heating coil located within said head for heating the same, and an electrical thermometer including a controlling coil disposed within said head and positioned so as to be responsive to the surface temperature of the head.

3. A surgical instrument comprising a hollow copper head, a handle supporting said head, a copper stud secured internally in said head and projecting longitudinally thereof, and an electric heating coil surrounding said stud, a copper sleeve secured to said head, and surrounding and spaced from said stud, and an electric thermometer including a controlling coil disposed on the outer face of said sleeve.

4. A surgical instrument including a hollow copper head, an internal copper stud secured to the head and projecting longitudinally thereof, said stud being spaced from the inner walls of the head, a copper sleeve secured to the other end of said head internally thereof and extending longitudinally of the head and surrounding said stud, said sleeve being spaced from said stud, an electrical heating coil surrounding said stud, an electric thermometer including a controlling coil surrounding the outer surface of said sleeve, and a handle for supporting said head.

5. A surgical instrument including a hollow copper head, an internal copper stud secured to the head and projecting longitudinally thereof, said stud being spaced from the inner walls of the head, a copper sleeve secured to the other end of said head internally thereof and extending longitudinally of the head and surrounding said stud, said sleeve being spaced from said stud, an electrical heating coil surrounding said stud, an electric thermometer including a controlling coil surrounding the outer surface of said sleeve, a hollow hard rubber handle having a flange, a cap adapted to engage said head and secure the flange of the handle thereto, and gaskets interposed between the flange and the cap whereby a tight joint is made between the handle and the head.

In testimony whereof, I affix my signature in the presence of two witnesses.

LOUIS D. BLISS.

Witnesses:
ALBERT POPKINS,
RUTH L. JONES.